Patented June 16, 1931

1,810,013

UNITED STATES PATENT OFFICE

IVAN GUBELMANN, HENRY J. WEILAND, AND OTTO STALLMANN, OF SOUTH MILWAUKEE, WISCONSIN, ASSIGNORS, BY MESNE ASSIGNMENTS, TO NEWPORT CHEMICAL CORPORATION, A CORPORATION OF DELAWARE

PROCESS OF PREPARING 4'-SULPHO-O-BENZOYL-BENZOIC ACID

No Drawing. Application filed July 2, 1927. Serial No. 203,265.

This invention relates to a process for making 4'-sulpho-o-benzoyl-benzoic acid.

It is an object of this invention to provide an economical and practical method for preparing 4'-sulpho-o-benzoyl-benzoic acid, which is an intermediate for valuable dyestuffs.

Other and further important objects of this invention will become apparent from the disclosures in the following description and appended claims.

We have now discovered that 4'-mercapto-o-benzoyl-benzoic acid or its corresponding disulphide may be oxidized under certain conditions into 4'-sulpho-o-benzoyl-benzoic acid. The fact that the oxidation step proceeds so smoothly and to the desired end product, without the formation of large quantities of by-products, is the more surprising in view of the statements in the literature to the effect that the oxidation with nitric acid of mercapto aromatic compounds is accompanied by the formation of by-products such as di-sulphide, thio-phenol sulphonic acid esters and others. (See Houben-Weyl, Die Methoden der Organischer Chemie, Vol. II, p. 163.) Likewise, where alkali hypochlorites are used as the oxidizing agent, the literature states that the sulphides pass over into the sulpho-oxides (Id. p. 166). Nowhere in the literature could we find a statement that sulphonic acids could be prepared directly by the use of alkaline oxidizing agents. In fact, it might be expected that alkaline hypochlorites would result in a chlorinated product.

We have, however, found that oxidizing agents such as the halogens in alkali solution, alkaline hypochlorites, and others give a smooth reaction resulting in a practically quantitative yield of 4'-sulpho-o-benzoyl-benzoic acid.

The reaction is probably best expressed by the following chemical equations in which M represents hydrogen or a metallic element, such as sodium, potassium, and the like.

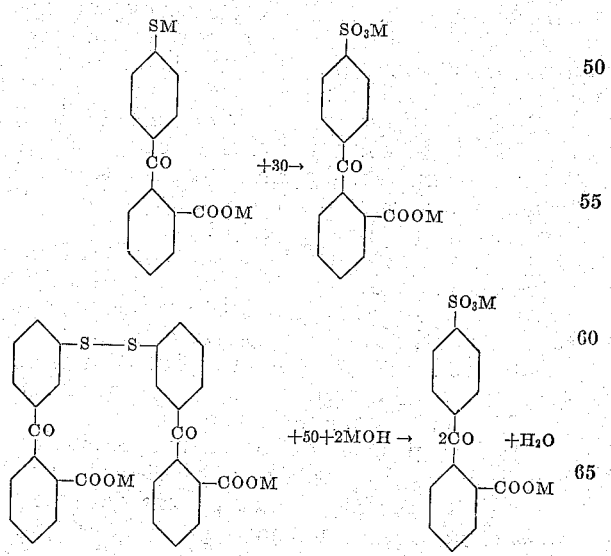

It is practically impossible to isolate the 4'-mercapto-o-benzoyl-benzoic acid in pure form on account of the fact that it is easily oxidized to the corresponding di-sulfide. Consequently, the starting material which we use is almost invariably a mixture of 4'-mercapto-o-benzoyl-benzoic acid and its corresponding di-sulphide. The latter compound, may, of course, be used by itself.

4'-sulpho-o-benzoyl-benzoic acid (mono sodium salt) is a white crystalline solid which can easily be recrystallized from alcohol or dilute sulphuric acid in the form of large white shining crystals. It is easily soluble in water, less so in dilute mineral acids and practically insoluble in dilute sulphuric acid, or hydrochloric acid saturated with either sodium chloride or sodium sulphate. It is very easily soluble in dilute caustic soda, sodium carbonate or ammonia. It is likewise readily soluble in alcohol, but less soluble in cold alcohol.

Without limiting our invention to any particular procedure, the following example, in which parts by weight are given, illustrates the application of our invention in the preferred form:

258 parts of crude 4'-mercapto-o-benzoyl-benzoic acid (containing a mixture of 4'-mercapto-o-benzoyl-benzoic and the corresponding disulphide) are dissolved in 350 parts of caustic soda and 5000 parts of water. Chlorine, about 213 parts, is introduced into this solution which is held at 70–90° C., until the solution changes in color from a deep yellow to a practically colorless solution. The reaction mass is acidified with sulfuric acid and filtered at about 80° C. The filtrate is cooled to room temperature whereupon the product crystallizes out, is filtered off and dried. The yield is practically quantitative.

Instead of starting with the above mixture of material, containing the 4'-mercapto-o-benzoyl-benzoic acid and its corresponding disulphide, either of the pure substances may be used as starting material, and instead of using as oxidizing agent chlorine as such, other oxidizing agents as sodium hypochlorite could be employed and instead of using caustic soda to make the soluble salts of the mercapto derivatives, other alkalies such as potassium hydroxide could be used.

We are aware that numerous details of the process may be varied through a wide range without departing from the principles of this invention, and we therefore, do not purpose limiting the patent granted hereon, otherwise than necessitated by the prior art.

We claim as our invention:

1. The process of preparing 4'-sulpho-ortho-benzoyl-benzoic acid which comprises reacting a substance having the following probable general formula

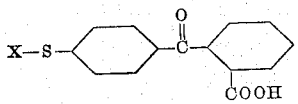

in which X is hydrogen, a metallic radical or an —S— aryl group with an oxidizing agent capable of oxidizing mercaptans to sulfonic acids.

2. The process of preparing 4'-sulpho-o-benzoyl-benzoic acid, which comprises reacting a mixture of 4'-mercapto-o-benzoyl-benzoic acid and its corresponding disulphide with an oxidizing agent which is a member of the group consisting of alkaline hypohalites and halogens in alkaline solution.

3. The process of preparing 4'-sulpho-o-benzoyl-benzoic acid, which comprises reacting a mixture of 4'-mercapto-o-benzoyl-benzoic acid and its corresponding disulphide with an alkaline hypochlorite.

4. The process of preparing 4'-sulpho-o-benzoyl-benzoic acid, which comprises reacting

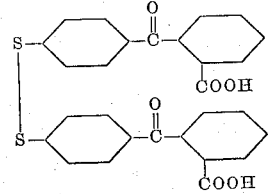

with an oxidizing agent which is a member of the group consisting of alkaline hypohalites and halogens in alkaline solution.

5. The process of preparing 4'-sulpho-o-benzoyl-benzoic acid, which comprises reacting

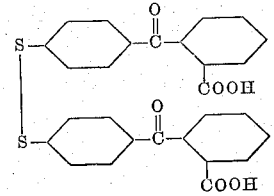

with an alkaline hypochlorite at an elevated temperature, and acidifying to precipitate out the product.

In testimony whereof we have hereunto subscribed our names at Carrollville, Milwaukee County, Wisconsin.

IVAN GUBELMANN.
HENRY J. WEILAND.
OTTO STALLMANN.